Nov. 2, 1965          P. I. VIDAL            3,214,793
            CONTINUOUS MOULDING APPARATUS
Filed Sept. 9, 1963                      2 Sheets-Sheet 1
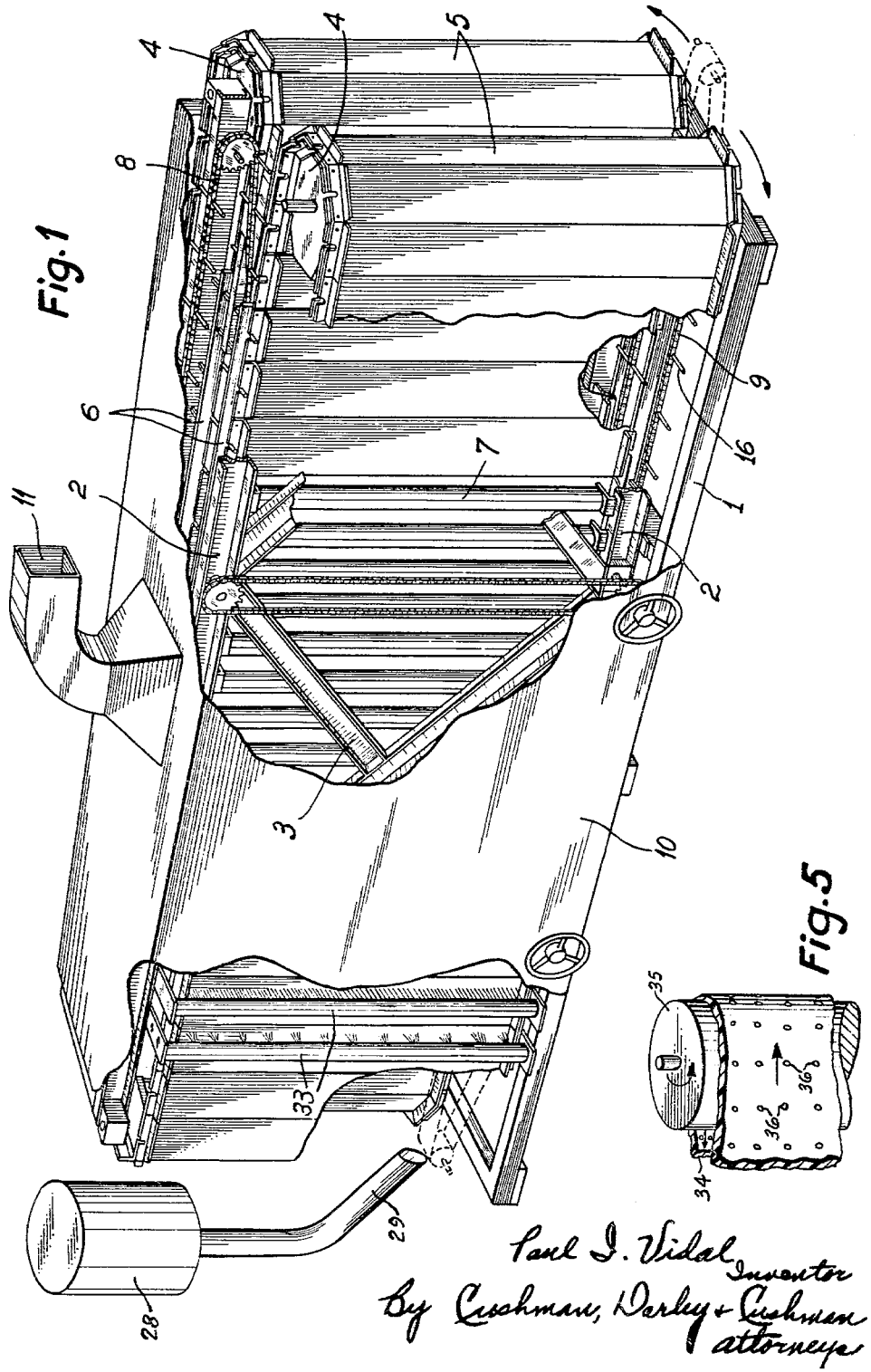

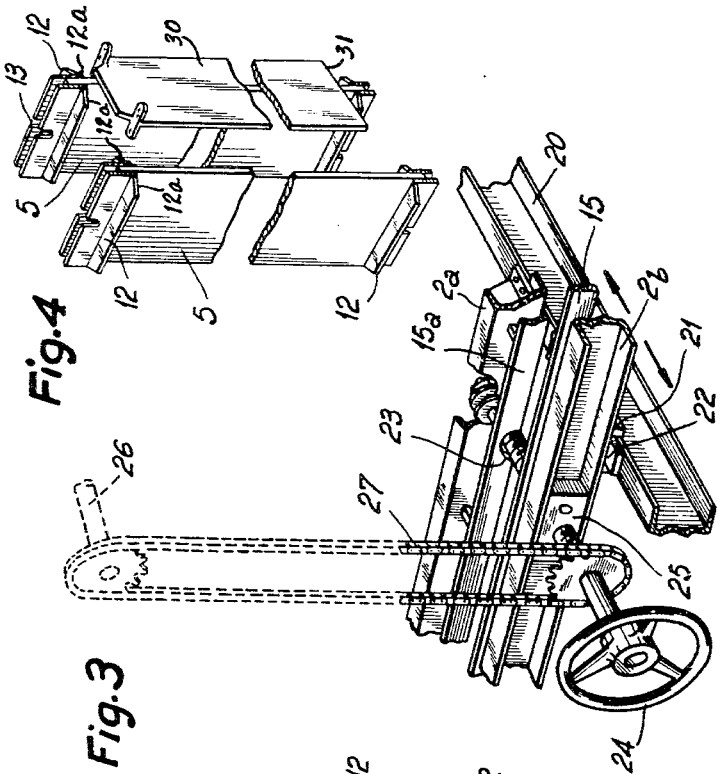
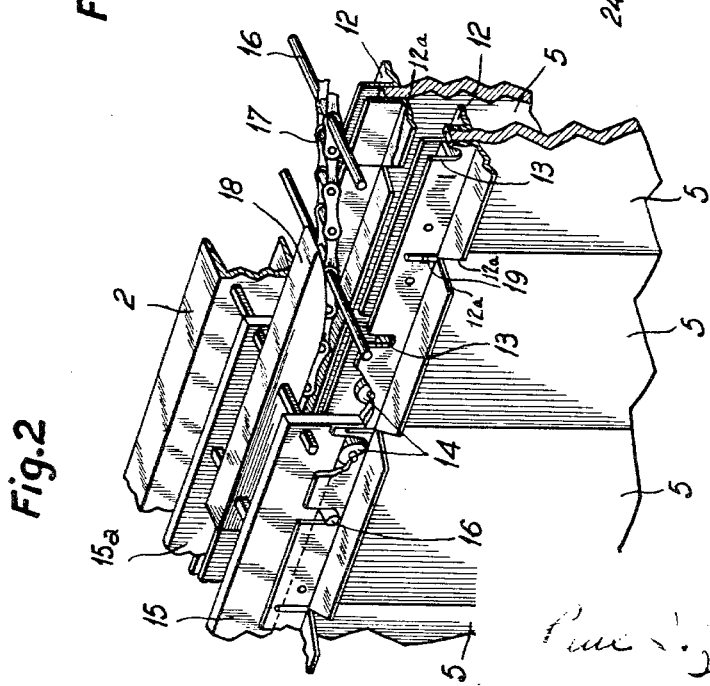

United States Patent Office 3,214,793
Patented Nov. 2, 1965

3,214,793
CONTINUOUS MOULDING APPARATUS
Paul I. Vidal, Villepinte, France, assignor to Rocma Anstalt, Vaduz, Liechtenstein, a corporation of Liechtenstein
Filed Sept. 9, 1963, Ser. No. 307,487
Claims priority, application France, Sept. 10, 1962, 909,018, Patent 1,333,395
11 Claims. (Cl. 18—4)

This invention relates to apparatus for the moulding of relatively large, flat elements such as sheets, panels, slabs or the like from plastic materials, especially suitable for the continuous formation of such elements which are of foamed, cellular or expanded character.

While various processes and apparatus are known whereby slab-like elements may be moulded in a continuous manner from synthetic plastic materials, such processes usually involving the provision of a continuously-moving horizontal mould surface, none of the means heretofore proposed, to the applicants' knowledge, are suitable for the continuous production of foamed or cellular plastic elements. The successful production of elements of this nature involves certain specific requirements especially in regard to homogeneous mixing, uniform pressure conditions and correct temperature relationships between the moulded mass and moulding surfaces, which requirements have not apparently been met by conventional moulding apparatus, so that prior attempts at continuous production of large lightweight foamed plastic slabs have not been commercially successful.

Objects of this invention are to provide improved apparatus for the continuous production of large moulded plastic slabs and similar large-sized elements, which will be especially (though not exclusively) suitable for the production of foamed or cellular elements of high, uniform, mechanical and physical characteristics and surface finish; to provide such apparatus which will be relatively simple and economical to build, operate and maintain, and highly efficient in use. Other objects will appear from the following description.

Continuous slab-moulding apparatus according to the invention may include one or more of the following features:

A frame, means on the frame providing a pair of vertical, parallel spaced wall surfaces defining, between them, a mould cavity of essentially vertical extent and relatively small transverse width, means for imparting to both wall surfaces a continuous displacement in a common longitudinal direction from an inlet to an outlet end, and means for continuously feeding a mass of mouldable material into the inlet end of the cavity, between said surfaces;

Means are provided for adjusting the effective spacing between the vertical wall surfaces;

For use with a majority of usual foamed plastic materials the spacing between the wall surfaces is of the order of one decimeter;

The apparatus comprises a frame, a pair of endless flexible bands each trained at its ends around a pair of drums or sheaves rotatable on vertical axes on the frame so as to define between adjacent parallel stretches of the respective endless bands a mould cavity of essentially vertical extent and relatively small transverse width, means for rotating the drums or sheaves in synchronism to impart a continuous bodily displacement to said adjacent stretches in a common longitudinal direction from an inlet to an outlet end, and means for continuously feeding a mass of mouldable material into the inlet end of the cavity;

Each of the endless bands consists of an endless series of interpivoted plates or strips defining narrow interstices between adjacent strips when the latter are positioned in coplanar relation in the adjacent flat stretches of the bands and guide means, such as rails, runways or the like, are provided on the frame for guiding the strips in their bodily longitudinal displacement;

The apparatus further include a movable base surface providing a bottom for the moulding cavity and means for bodily displacing said base surface relative to the frame in synchronism with said vertical wall surfaces or endless bands;

The movable mould base surface comprises a horizontal upper stretch of an endless band having its ends trained about end drums or sheaves mounted for rotation about horizontal transverse axes on the frame;

Means are provided for controlling the temperature of, i.e. heating or/and cooling, selected surfaces of the mould cavity;

The apparatus may include separator plates or strips insertable in vertical transverse planes at selected positions between the walls of the mould cavity and movable bodily therewith for the production of separate slab-like moulded elements of prescribed length.

The above and further features and advantages of the invention will become apparent from the ensuing disclosure relating to a preferred embodiment selected by way of illustration but not of limitation and illustrated in the accompanying drawings, wherein:

FIG. 1 is a perspective view, with parts broken away, of a moulding machine according to the invention;

FIG. 2 is a broken-away perspective view, to a larger scale, of part of the machine of FIG. 1 including the upper part of the mould wall strips and drive mechanism therefor;

FIG. 3 is a fragmentary perspective view illustrating mechanism for adjusting the width of the mould cavity;

FIG. 4 is a fragmentary perspective view illustrating a separator plate or strip inserted in a vertical transverse plane between the walls of the mould cavity; and FIG. 5 is a fragmentary perspective view of a modified mould wall and drive cylinders for the machine of FIGURE 1.

The moulding machine generally shown in FIG. 1 includes a base frame 1 comprised of sectional members welded to provide a generally rectangular open base for the machine. The base frame 1 supports two similar and symmetrical side frame assemblies each consisting of lower and upper horizontal longitudinal frame members 2, interconnected by diagonal bracing members 3, so as to provide a pair of vertical side frame assemblies of rectangular over-all shape.

Supported at the ends of each of the side frames and journalled therein for rotation about vertical axes in conventional bearing means not shown, are two pairs of polygonal-prismatic drums 4. The pair of drums 4 positioned on a common side frame of the machine serve to support the ends of a related endless band assembly made up of a series of interpivoted plates or strips 5 of generally vertical extent corresponding in width to the width of the sides of the polygonal drums. The construction of the endless bands will be described in greater detail later.

As will be apparent from the drawing the two endless bands thus provided include adjacent, straight stretches which define a pair of vertical parallel side walls for a moulding cavity as will presently appear. The strips 5 are positively guided in these straight stretches of their paths by means of longitudinal guide means generally designated 6 extending along the tops of the respective side frames and described in greater detail with reference to FIG. 2. A series of longitudinally spaced vertical rollers 7 are mounted along the length of each side frame to provide a backing for the outer surfaces of the strips 5 and assist in guiding the latter smoothly along the active stretches of their paths of motion.

Means are provided for imparting uniform displacement to both endless band assemblies so that the active stretches thereof will move bodily together in a common longitudinal direction, and these drive means in the preferred embodiment described are arranged to act on each of the individual strips 5 throughout the length of their active stretches. The drive means include an upper drive chain and a lower drive chain extending the length of each side frame and drivingly cooperating with each of the strips 5 as presently described, said drive chains being generally designated 8 and 9 respectively in FIG. 1.

Referring to FIG. 2, it will be seen that each of the wall strips 5 has a pair of short angle sections 12 secured to its opposite sides along the upper end of the strip, said angle sections having aligned, outwardly directed flanges cut at a bevel at their ends as shown at 12a so as to allow relative angling between the strips on passing around the end drums 4. The vertical flanges of the angles 12 serve to interpivot the adjacent strips by means of conventional hinging means 19 provided at their ends. The pivot means are so arranged that narrow gaps are present between the adjacent vertical side edges of the strips when the latter are coplanar. It will be understood that the angle sections 12 and related components illustrated in FIG. 2 as provided at the upper ends of the strips 5, are also provided in identical and symmetrical relation at the lower ends of the strips, as will be understood without further detailed description.

The upper guideway means generally designated 6 in FIG. 1 include as shown in greater detail in FIG. 2 a pair of strip-like rail members 15 and 15a secured to the respective upper side frame members 2 and extending the length of the side frames. The strips 15, 15a have their lower parts extending freely between the vertical flanges of the angles 12. Rollers 14 pivoted on horizontal pivots projecting transversely from the vertical flanges of the angle sections 12 in an inward direction therefrom, engage the under sides of the said rails to ensure the desired guiding relationship.

The upper chain drive means generally designated 8 in FIG. 1 include as shown in greater detail in FIG. 2 a pair of endless sprocket chains trained at their ends around sprockets pivoted on horizontal axes projecting from the upper side frame members 2 and driven through suitable transmission from a motor, not shown. Each chain, designated 17 in FIG. 2, has drive pins 16 projecting transversely therefrom at spaced points and engageable with cutouts 13 formed in the vertical flanges of the angle sections 12, substantially at the midpoint of the width of each wall strip 5. It will be noted, as shown for the leftmost drive pin in FIG. 2, that the drive pins are adapted to be retained in engagement with the cutouts 13 throughout the major part of the extent of the active stretches of the strips 5 by the under surface of the rail strips 15, 15a. The rails are terminated at each end of the machine somewhat short of the related end of the respective side frames. A camming member 18 secured to the upper side frame members 2 between the rails 15 and 15a in the end area of the latter has an arcuate under surface as clearly visible in FIG. 2, which is engaged by the lower stretch of the endless sprocket chain 17 so that the chain is gradually depressed and the drive pins 16 are brought smoothly into engagement with the cutouts 13, to be thereafter retained therein by the under surfaces of the rails 15, 15a as indicated above. At the output end, the drive pins 16 are lifted out of engagement with the cutouts 13 by the tension of the sprocket chain as soon as they are no longer retained therein by the under surfaces of the rails beyond the extremity of the latter.

In the preferred embodiment shown, means are provided for adjusting the transverse spacing between the active stretches of the endless bands and hence the width of the mould cavity. For this purpose one of the two side frames of the machine is mounted for adjustable displacement towards and away from the other side frame, as will now be described with reference to FIG. 3. That figure illustrates an end part of the base of the machine including a transverse member, herein designated 20, of the base frame 1, and the lower longitudinal frame members 2 of the respective side frames, herein designated 2a and 2b. Also shown are portions of the lower guide rails 15a and 15, respectively secured to the side frame members 2a and 2b. Side frame member 2a is fixedly secured to the upper part of base frame member 20 as well as to the remaining cross members of the base frame 1, not shown in FIG. 3. Side frame member 2b, however, is mounted for transverse displacement across the base frame members such as 20, by way of a shoe 22 extending along the upper surface of member 20, and a pair of spaced guide members 21 projecting from the under surface of side frame member 2b and engaging opposite sides of the shoe 22.

A screw rod 23 has one end rotatably mounted in frame member 2a, being locked against axial displacement with respect thereto, and extends across both members 2a and 2b, being mounted in threaded engagement with a nut member 25 secured to the movable side member 2b. A handwheel 24 secured to a projecting end of screw rod 23 will thus produce, when rotated manually, displacement of side member 2b towards or away from member 2a as indicated by arrows.

The arrangement at the upper part of the machine is generally similar to that just described with reference to FIG. 3, with the upper longitudinal frame member of one of the side frames (the near side frame as shown in FIG. 1) being mounted for adjustable displacement towards and away from the corresponding member of the other side frame. A screw rod 26 similarly arranged to screw rod 23 is provided for producing rapid displacements, and preferably the two adjusting screw rods 23 and 26 are coupled for simultaneous rotation from the handwheel 24 by way of a sprocket chain drive 27 as shown. However the upper screw rod 26 may be made independently rotatable if desired.

In view of the considerable length of the machine described, two or more screw adjusting devices of the kind shown in FIG. 3 are preferably provided, spaced along the length of the machine, and FIG. 1 shows two such devices as indicated by the presence of the two handwheels shown in that figure. It is noted that while the two (or more) screw adjusting devices may be arranged for simultaneous operation from a common handwheel, it is often desirable to provide for their being separately actuated by the separate handwheels as shown, both in order to permit differential width adjustment and thus compensate for the presence of clearance in the transverse guiding means of the movable side frame, and also possibly to facilitate the removal of the moulded slab elements from the moulding machine.

A bottom wall of the mould cavity defined between the inner active stretches of the endless bands 5 may be provided according to the invention in any of various forms.

In cases where the width dimension of the mould is relatively narrow, a strip of relatively strong yet flexible, and preferably expendable, material, such as pasteboard or the like, can be fed continuously with the feed of the vertical mould walls from the inlet end thereof, being supported on the inwardly projecting flanges of the inner angle sections 12 at the lower ends of the wall strips 5.

According to a feature of the invention, however, it is contemplated especially in the case of relatively thick moulded slabs, to provide the base wall of the mould cavity in the form of a stretch of a third endless band assembly, having its ends trained around end rollers rotatable about horizontal axes at the ends of the machine, as indicated schematically in dotted lines in FIG. 1. This horizontal endless band may be a continuous band of flexible material, or it may consist of an assembly of interpivoted strips similar to the strips 5. With the preferred width dimension of the slabs produced by the machine, which is of the order of one decimeter, the provision of a mould bottom wall in the form of an endless band will not generally be found indispensable. Nevertheless, such a construction may have the additional advantage of facilitating temperature control of the mould base, as will now be described.

In the production of foamed or cellular plastic elements, it is usually necessary to supply heat. Moreover, especially in cases where thermoplastic materials are used, it is necessary to cool the moulded elements in order to set the material thereof after foaming. For these reasons, it is contemplated that temperature control means will be associated with all or part of the wall surfaces of the mould cavity. Any suitable temperature controlling means may be used for this purpose, including heating resistors incorporated in the wall plates 5, or arranged in fixed positions immediately outward of the wall strips. Instead of electric heaters, fluid medium at controllable temperature may be circulated through or adjacent the wall strips. Alternatively or additionally, the rollers 7 may be used to incorporate therein electrical or fluid-flow temperature control means. As mentioned above, such means may also be associated with the bottom of the mould cavity. The temperature control means will usually be required to bring the wall elements to a temperature in a range of from 30 to 100° C. depending on the compositions used. The cooling means, if used, as earlier mentioned, will be required to cool the plates promptly from a temperature of about 100° C. to ambient.

The wall strips 5 may be made from any suitable material having the requisite mechanical strength, good heat conductivity and resistance to chemical agents; suitable aluminum base alloys have proved satisfactory.

In the operation of the machine described, the drive chain 8 is rotated from a suitable power source in a direction to displace the active stretches of the endless band assemblies 5 rightward according to FIG. 1. The inner surfaces of the strips 5 are coated with a suitable mould-stripping agent. A mix of the desired mouldable composition, which may include a suitable thermoplastic or thermosettable resin, foaming agent, foaming and/or polymerization catalyst, and any additional ingredients, is prepared at a continuous mixing station 28, positioned to the left of the machine shown in FIG. 1, and is fed in a continuous manner and at a metered rate into the (left) input end of the machine in between the moving walls of the moulding cavity. The particular feeding means 29 form no part of this invention.

In any particular production series, there are certain important operating parameters to be predetermined depending mainly on the nature of the moulded composition and the dimensioning, primarily the width or thickness dimensions, of the moulded slabs. These parameters include chiefly the input temperature of the mix, the temperature conditions provided along the side walls (and possibly the bottom wall) of the mould cavity, and the linear feed rate imparted to the moving side walls of the cavity. These parameters will be readily determined by those familiar with the art after a few preliminary tests conducted with the improved machine.

In some cases it may be desirable to supplement the afore-mentioned mould-stripping agent by feeding concurrently with the mix continuous sheets of flexible material along the inner surfaces of the side walls of the mould.

As the mix advances in the mould cavity with the moving walls of the latter, it progressively foams and expands, rising along the side wall surfaces of the mould cavity. The input feed rate should be so adjusted and controlled that the foamed mix does not rise substantially higher than the level of the horizontal flanges of the upper angle sections 12. During the latter part of the movement of the foamed mix through the moving mould system the mix sets and hardens as it approaches the outlet (right) end of the machine. If the composition being moulded is of a thermosettable character, the temperature control means earlier referred to are regulated essentially to provide the necessary heat for the foaming and setting of the mass. If the composition is a thermoplastic one, then the temperature control means should be adjusted so as first to heat the mould walls and then to cool them in an output section of the mould.

The finished slab elements issuing continuously from the outlet (right) end of the machine are received at any suitable receiving station in which they are cut to the requisite lengths and may receive any further desired treatment. If desired, the slabs may be formed to the desired lengths directly within the machine. For this purpose the invention contemplates inserting removable separator wall elements at desired intervals between the wall elements 5 of the respective endless bands. Such separator elements 30 as shown in FIGURE 4 preferably extend over the major part of the height of the elements 5 but have their lower ends 31 spaced somewhat above the bottom surface of said cavity in order not to interfere with the continuous feed of the mix into the machine. The removably insertable separator elements 30 move bodily with the adjacent straight flights of the wall elements 5. As exemplary means for effecting such movement the separators may be placed in the V-shaped notches between the adjacent flange 12 bevel ends 12a. The tabs 32 support the separators 30 on the flanges 12.

In the maintenance of the machine described an important point is to keep the inner or active surfaces of the wall strips 5 in a thoroughly clean condition. This is greatly facilitated by the endless character of the system described, since automatic (and/or manual) cleaning means can very easily be provided in association with the outer, return, stretches of the two endless bands. Thus, there may be provided on each side of the machine disclosed a pair of cleaning stations equipped with any suitable scraper, sprayer means and the like for continuously cleaning the active surfaces of the wall strips 5 as they commence their return movement from the outlet towards the inlet end of the machine. These cleaning stations 33, as illustrated at the left of FIGURE 1, may be followed by automatic stations for coating said active surfaces with mould-stripping agent. The simplicity with which the functions just referred to can be performed in a continuous and automatic manner constitutes one of the advantages of the machine described.

The gaps present between the adjacent vertical edges of adjacent wall strips 5 in the active stretches of their travel, as earlier described, serve to prevent the creation of excess pressure in any area of the mass being moulded, such gaps providing a means of escape for any excess gas generated during the foaming as well as for excess portions of material. It is well-known that the presence of such excess pressures has heretofore been a source of considerable trouble in the conventional production of foamed plastic products.

The machine is preferably provided with a cover or hood as shown having a conduit 11 for drawing off the gas and vapours generated during the continuous foaming and moulding process.

An important advantage of the machine described lies in the provision of a continuous mould cavity in the form of a relatively narrow, vertically extending channel, through which the gases generated in the foaming process are able to escape vertically upwards to be collected and drawn off through the hood and conduit 11. It has been found that this form of moulding cavity results in the formation foamed or cellular slabs of greatly improved and uniform characteristics, especially when coupled with the proper temperature control of the vertical mould walls.

It will be apparent that various modifications and departures from the illustrated embodiment may be made without exceeding the scope of the invention. Only a few of these modifications will be explicitly mentioned.

If desired, the active surfaces of the wall elements 5 may be provided with corrugations or any suitable patterns in relief for imprinting corresponding corrugations or patterns on the sides of the resulting slab elements.

The endless bands used according to the invention to define the continuously moving vertical mould cavity may be provided in the form of bands of continuous flexible sheet material 34 as shown in FIGURE 5 rather than as inter-hinged strips. The polygonal drums 4 may then be replaced by cylinders 35. The endless bands if provided continuous are preferably formed with spaced holes 36 therein as a substitute for the gaps provided between the adjacent interpivoted strips 5 for the purpose earlier indicated. The driving and guiding means would then be correspondingly modified as required. It is noted however that the preferred embodiment of the invention employs interpivoted wall strips as described rather than continuous endless sheets, since this construction has been found to provide better performance under mechanical and thermal stress.

While it is preferred to drive the endless bands forming the mould side walls through mechanism that remains in driving engagement with the bands throughout the length of the active stretches thereof, such as the sprocket chain drive described, it may be practical, especially in the case of relatively small machines according to the invention, to apply the drive power to one of the end drums 4 of each endless band, thereby simplifying the drive mechanism.

The preferred application of the improved machine is to foamed plastic slab-like elements, but the invention is not restricted to this particular application, since many of its features would be of value in the continuous moulding of elements of similar form made from a wide variety of compositions, including non-cellular plastic slabs or sheets (e.g. polyvinyl sheet), compressed wood-dust agglomerate slabs, plaster and concrete slabs, and even including the moulding of certain food pulp products such as cake, biscuits and the like.

What I claim is:

1. Apparatus for continuously moulding foamed plastic slabs comprising: a frame; two laterally spaced parallel pairs of rotatable elements mounted on said frame and having vertically directed longitudinal axes, said rotatable elements being rotatable about said axes; an endless band means entrained about each pair of rotatable elements for movement therewith, each endless band means being substantially greater in height than the lateral distance between the adjacent, parallel stretches of the respective endless band, means defined by the region of closest approach of the endless band means to one another; means defining a generally horizontal base surface substantially bridging the distance between said endless band means adjacent the lower extent of said endless band means, the adjacent, parallel stretches of said endless band means and said base surface defining among them a mould cavity of essentially vertical extent and relatively small lateral width; means for continuously advancing the endless band means and base surface means in synchronism; means defining a plurality of pressure relief openings through said endless band means throughout a substantial portion of the height and longitudinal extent thereof; said mould cavity having an inlet end and an outlet end; means for continuously depositing a mouldable, foamable mix into the lower region of said mould cavity adjacent said mould cavity inlet end, whereby said mouldable, foamable composition expands essentially vertically upwardly as it is carried bodily by said endless band means and base surface through said apparatus from the inlet end of said mould cavity to the outlet end thereof and whereby excess gas generated during the foaming of the mix escapes from said mould cavity through said pressure relief openings.

2. Apparatus according to claim 1, comprising means for adjustably displacing one of the endless band means towards and away from the other for varying the width dimension of the mould cavity.

3. Apparatus according to claim 1, wherein each of said endless band means comprises a continuous band of flexible sheet material; and wherein the pressure relief openings comprise spaced holes through said flexible sheet material.

4. Apparatus according to claim 1, comprising separator elements removably insertable transversely between said adjacent straight flights for bodily movement therewith at positions spaced therealong for dividing said moulding into separate slabs of predetermined length.

5. Apparatus according to claim 1, including means mounted at the opposite sides of both said endless band means for applying a treating agent to the active surfaces thereof as said active surfaces are directed outwards in the return flights of said endless band means.

6. Apparatus according to claim 1, wherein the mold cavity base surface is defined by a third endless band mounted on the frame so as to have an upper stretch extending horizontally across the lower ends of the straight adjacent stretches of both first-mentioned endless band means and displaceable bodily therewith.

7. Apparatus according to claim 1, wherein the width of said cavity is of the order of one decimeter.

8. Apparatus according to claim 1, including hood means overlying said mold cavity for collecting gases evolved from said composition and conduit means connected with the hood means for drawing off said gases.

9. Apparatus according to claim 1 wherein each of the endless band means comprises a plurality of strips, each strip being substantially longer vertically than wide horizontally, means pivotally securing the strips in each endless band to one another for pivoting movement about generally vertical axes; said rotatable elements being polygonal prismatic in shape for surface to surface engagement with said strips; and said pressure relief openings comprising narrow gaps between adjacent of said strips.

10. Continuous moulding apparatus comprising a frame, two endless bands mounted for rotation on the frame so as to have adjacent straight stretches thereof in generally parallel spaced vertical planes defining the opposite side walls of a moving mould cavity of generally vertical extent, the height of said bands being substantially greater than the distance between said planes; an endless driving element having a horizontal stretch extending parallel and adjacent to said straight stretches of both endless band means, cooperating driving means on said driving element and both said endless band means engageable adjacent an inlet end of said straight stretches and disengageable adjacent an outlet end thereof whereby continuous displacement of said endless driving element will rotate both endless band means in synchronism with said adjacent straight stretches thereof being moved bodily in a common direction from said inlet to said outlet end, and means for feeding mouldable composition into said inlet end of the mould cavity whereby to produce a slab-like moulding issuing from said outlet end thereof.

11. Apparatus according to claim 10, wherein said endless driving element comprises a sprocket chain, and said cooperating driving means include projections spaced along said chain engageable with and disengageable from cooperating driving means on said endless bands.

References Cited by the Examiner
UNITED STATES PATENTS

| | | | |
|---|---|---|---|
| 1,313,558 | 8/19 | Sargent | 25—99 |
| 1,440,715 | 1/23 | Bliss. | |
| 2,441,235 | 5/48 | Blair et al. | 18—4 |
| 2,549,864 | 4/51 | Toulmin. | |
| 2,575,092 | 11/51 | Bouvier et al. | 18—26 X |
| 2,835,016 | 5/58 | Dixon. | |
| 2,841,205 | 7/28 | Bird. | |
| 2,929,793 | 3/60 | Hirsh | 18—4 X |
| 2,983,983 | 5/61 | Mayer | 25—99 X |
| 3,048,888 | 8/62 | Shockley | 25—99 X |
| 3,065,500 | 11/62 | Berner | 18—4 |
| 3,066,351 | 12/62 | Schriner | 18—26 X |

WILLIAM J. STEPHENSON, *Primary Examiner.*